United States Patent [19]
Durina

[11] Patent Number: 5,096,302
[45] Date of Patent: Mar. 17, 1992

[54] PLASTIC FEEDING DEVICE AND METHOD

[75] Inventor: Michael F. Durina, Poland, Ohio

[73] Assignee: Spirex Corporation, Youngstown, Ohio

[21] Appl. No.: 690,558

[22] Filed: Apr. 24, 1991

[51] Int. Cl.$^5$ .................. B29C 31/00; B29C 47/10
[52] U.S. Cl. .................. 366/76; 264/211.21; 264/349; 366/182; 425/145; 425/DIG. 5
[58] Field of Search .......... 364/211.21, 211.23, 364/176.1, 349, 211, 40.7; 425/145, 147, 376.1, DIG. 5; 366/76, 75, 77, 80, 192, 193, 182

[56] References Cited

U.S. PATENT DOCUMENTS

| | | | |
|---|---|---|---|
| 1,362,928 | 12/1920 | Debay | |
| 2,760,232 | 8/1956 | Rougemont et al. | |
| 3,360,824 | 1/1968 | Schippers | 264/211.23 |
| 3,468,518 | 9/1969 | Koch | 259/6 |
| 3,553,786 | 1/1971 | Bentley | |
| 4,154,535 | 5/1979 | Maillefer | 366/79 |
| 4,652,226 | 3/1987 | Chevroulet et al. | 425/147 |
| 4,728,475 | 3/1988 | Beck | 425/145 |
| 4,783,300 | 11/1988 | Grunwell | 264/211.23 |
| 4,863,366 | 9/1989 | Kim | 264/211.21 |
| 4,937,034 | 6/1990 | Sewell | 264/211.21 |

FOREIGN PATENT DOCUMENTS

| | | | |
|---|---|---|---|
| 1178343 | 9/1964 | Fed. Rep. of Germany | 366/76 |
| 53-123461 | 10/1978 | Japan | 425/147 |
| 822867 | 4/1981 | U.S.S.R. | 366/76 |

Primary Examiner—Jeffery Thurlow
Assistant Examiner—Mathieu Vargot
Attorney, Agent, or Firm—Buchanan Ingersoll; Alvin E. Ring

[57] ABSTRACT

A method and apparatus for regulating the flow of plastic particulates to the opening of a cylinder of a plasticating screw. The particulate pass through a feed throat disposed at a feed opening of the drum. A valve mechanism disposed in the feed throat includes upper and lower members connected by pivot means. A fulcrum is located below the pivot means and the lower member bears on the fulcrum. The upper member is moved up or down which in turn causes the lower member bearing on the fulcrum to swing about the pivot means to open or close the valve. As the valve is closed, the lower member moves downwardly towards the rotating screw to prevent flooding with particulates of the feed opening of the cylinder.

17 Claims, 2 Drawing Sheets

PLASTIC FEEDING DEVICE AND METHOD

BACKGROUND OF INVENTION

1. Field of the Invention

This invention relates to an apparatus and method for metered feeding of plastic particulates from a feed hopper to the feed pocket of a plasticating screw.

2. Description of the Prior Art

A plasticating extruder or injection machine comprises a rotating screw within a cylinder which receives polymer pellets or powder, heats and works the polymer sufficiently to convert it to a melted or plastic state and delivers the melted polymer through a restricted outlet or die.

The cylinder for the plasticating screw is provided with a feed opening for receiving plastic pellets from an overhead hopper. The pellets commonly flow from the overhead hopper through a feed throat conduit to the feed opening on the cylinder with some type of flow regulating means disposed within the feed throat conduit.

The prior art flow regulating devices commonly entailed flood feeding wherein a considerable reservoir of feed particulates could accumulate below the flow regulating valve and above the rotating screw. Thereby, a flood feeding device commonly oversupplied the flight root of the screw with particulates. The oversupply of particulates created two problems. First, the escape passage back to the feed conduit of water vapor and resin volatiles formed within the screw could become blocked by a static oversupply of feed particulates in the feed throat. Secondly, and more importantly, the flood of feed particulates above the feed opening of the cylinder created a high shear drag between the rotating screw and its surrounding cylinder as the screw rotated. High shear forces increase the energy requirements of the plasticating device.

SUMMARY OF THE INVENTION

This invention provides an apparatus and method for regulating the flow of plastic particulates from an overhead hopper through a feed throat conduit to the feed opening in a plasticating screw which greatly reduces or eliminates the static head of particulates above the flight of a rotating plasticating screw. This invention provides apparatus and method which can partially rather than completely fill or overfill the flight root exposed below the feed opening upon rotation of the screw.

According to the invention, a valve mechanism is mounted within the feed throat conduit with the mechanism comprising upper and lower members, said upper and lower members joined together by pivot means so that the lower member can swing on said pivot means. The upper member is slidably retained by bracket means mounted on the conduit wall. Fulcrum means is also mounted on the conduit wall at a position below the pivot means. The lower member extends downwardly and bears upon the fulcrum means so that the fulcrum means causes the lower member to swing about the pivot means relative to said upper member as the upper member is caused by motive means to slide vertically within the bracket means. The lower member comprises a downwardly extending swinging gate for opening and closing the feed throat as the motive means moves the upper member in an upward or downward vertical direction, respectively.

A movement of the upper member in a downward direction causes the lower downwardly extending member to swing towards the opposite conduit wall to close the feed throat. It is a characteristic of the closure movement that the lower member moves vertically into closer proximity with the feed opening and the rotating screw as compared to the position of said lower member when said feed throat is open. In a practical embodiment, in the closed position the outer edge of the lower member can be no more than about one eighth of an inch away from the flight of the screw. Thereby, the swinging valve when in the closed position comprises a barrier against flooding of the flight channel with particulates and can even prevent complete filling of the flight channel, if desired. Because there is little or no accumulation of particulates below the gate when the valve is closed, the shear drag occurring upon rotation of the screw is minimized.

The valve mechanism can be actuated manually or automatically. It can be set at a particular opening with a given type and size of particulates in a extrusion operation and then at another opening with other particulates. It can be intermittently opened and closed in an injection operation.

DESCRIPTION OF PREFERRED EMBODIMENTS

Figure 1:
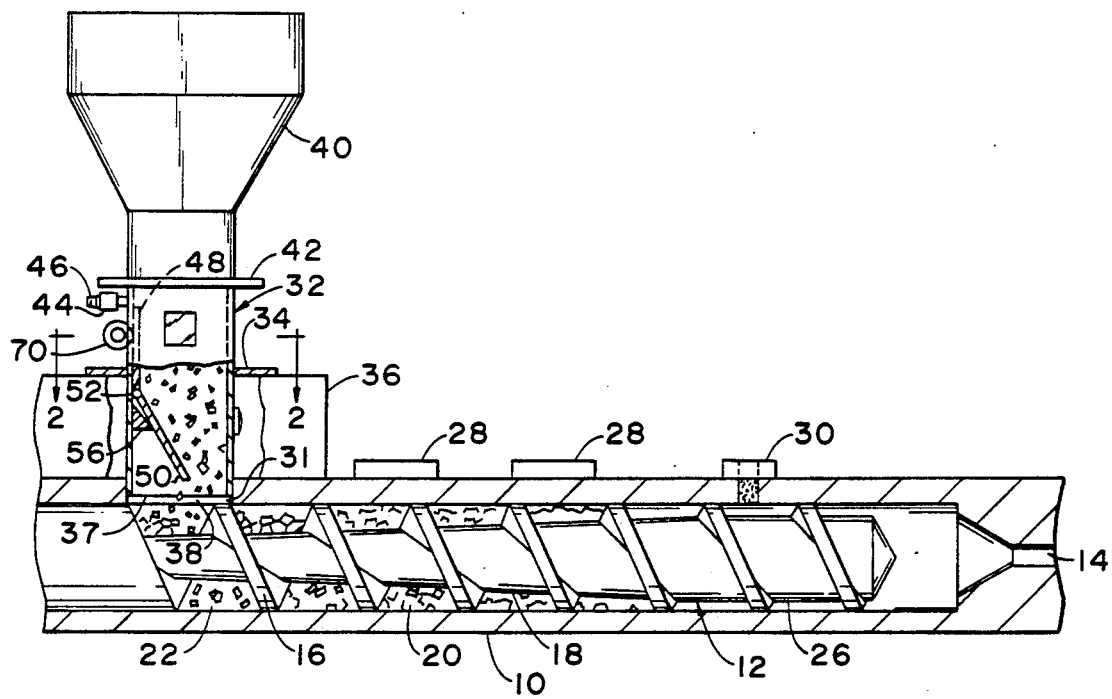
FIG. 1 is a cross-sectional and partially cutaway view of the combination plasticating screw, cylinder and feed metering apparatus of the invention.

FIG. 1 shows barrel or cylinder 10 enclosing plasticating screw 12. Screw 12 includes helical flights 16 on core 18 and the surface of core 18 defines the root of helical valley 20. The screw has a relatively deep root feed section 22 for the admission and conveying of a solid feed resin, a transition section 18 of reduced root depth to adapt to reduced volume of resin due to elimination of air spaces between the solid plastic particles and a relatively shallow root metering or pumping section 26 wherein the plastic or resin is predominantly in the molten state with only a minor amount of solid particles remaining or no solid particles. There is a discharge cone or valve 14.

Barrel or cylinder 10 is provided with heating elements 28 for providing heat to the barrel to melt the resin particles and a vent 30, which is optional, is provided for the discharge of water and resin volatiles from barrel 10. Barrel 10 is also provided with feed opening 31 into which feed throat conduit 32 is inserted.

The exterior of feed throat conduit 32 is provided with collar 34 which permits conduit 32 to rest upon feed casting 36 which in turn is mounted on cylinder 10. Collar 34 is located at an elevation on conduit 32 so that bottom edge 37 of conduit 32 has a very small clearance 38 from the outer edge of flight 16. In one embodiment the clearance 38 is about one eighth of an inch.

Feed pellet hopper 40 is mounted on the top or inlet end of feed conduit 32 and is secured to conduit 32 by means of flange 42. A vibratory device 44 is mounted on the side of conduit 32 to vibrate conduit 32 and prevent damming of particles therein which can result in obstruction of feed flow to cylinder 10. Vibratory device 44 can be pneumatically operated, if desired, in which case a pair of conduits 46 are provided for inlet and exhaust of pressurized air.

Figure 2:
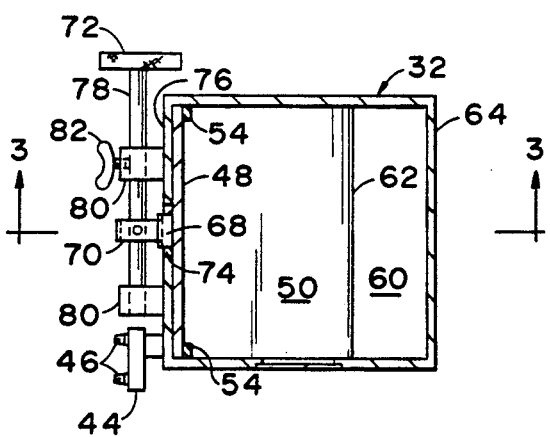
FIG. 2 is a view of the feed metering apparatus taken through section 2—2 of FIG. 1.

FIGS. 2, 3A, 3B and 3C present more detailed views of the adjustable valving mechanism for supplying feed pellets to drum 10. As shown in FIG. 2, feed conduit 32 can be square or rectangular in cross-section. The valving mechanism comprises an upper flat plate 48 and a lower flat plate 50 joined to each other along the lower edge of the upper plate and the upper edge of the lower plate along pivot 52. In effect, plates 48 and 50 with pivot 52 constitute a swinging hinge.

Figure 3C:
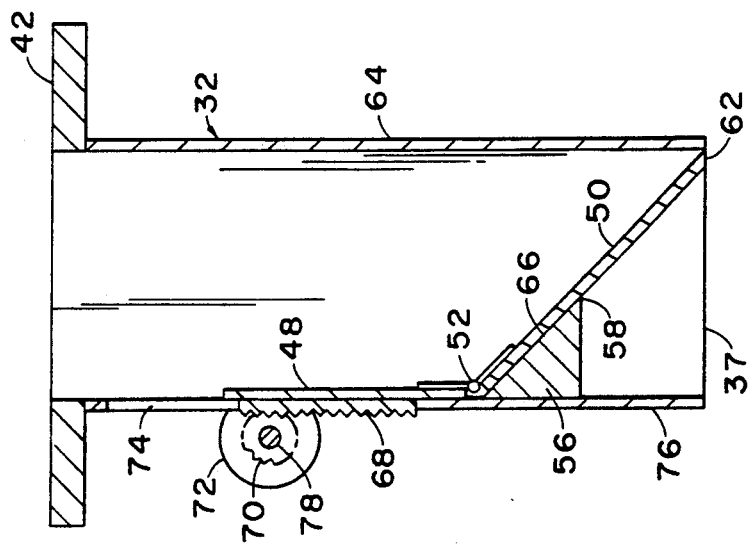
FIGS. 3A, 3B and 3C are side cross-sectional views of the feed metering apparatus taken through section 3—3 of FIG. 2 and show the valve gate in fully open, partially open and closed positions, respectively.
Figure 3B:
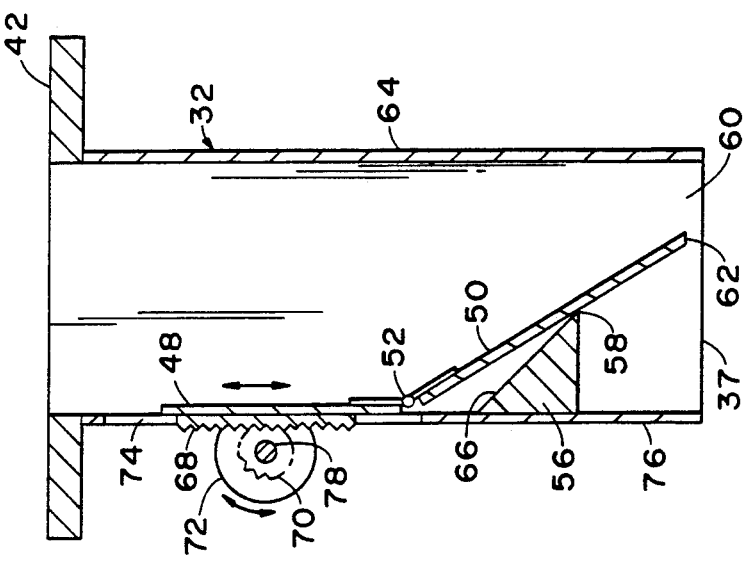
Figure 3A:
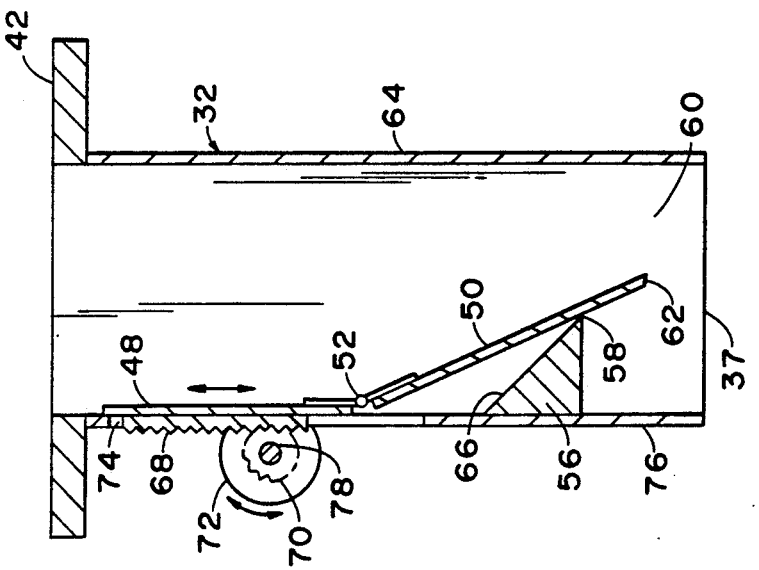

Upper plate 48 is movably but non-rotationally supported against wall 76 of conduit 32 by means of a pair of brackets 54, as shown in FIG. 2. Brackets 54 allow upper plate 48 up and down vertical movement but prevent upper plate 48 from rotating on pivot 52. Lower plate 50 bears upon fulcrum 58 which can be the apex of wedge 56. Wedge 56 can be triangular in cross-section. As shown in FIGS. 3A, 3B and 3C, as upper plate 48 moves in a vertical direction the fact that lower plate 50 bears on fulcrum 58 causes the lower plate to serve as a swinging gate to provide an opening 60 of varying size between lower edge 62 of lower plate 50 and front wall 64 of conduit 32, or to provide for the disappearance of opening 60.

FIGS. 3A, 3B and 3C show that as upper plate 48 moves in a downwardly direction, fulcrum 58 urges edge 62 progressively closer to wall 64, so that opening 60 becomes progressively smaller. Finally, when pivot 52 reaches wedge 56, lower plate 50 abuts flush against hypotenuse surface 66 of wedge 56. When this occurs, lower edge 62 of lower plate 50 just comes into contact with conduit wall 64 to close valve opening 60, as shown in FIG. 3C. In the closed position of FIG. 3C, lower edge 62 of plate 50 is at the bottom edge 37 of conduit 32. As indicated above, bottom edge 37 of conduit 32 can be only about one eighth of an inch above screw flight 16. In this manner, there is essentially no accumulation of pellets above helical valley 22 when the valve is closed. The avoidance of a reservoir of pellets above root valley 22 after root valley 22 is filled or partially filled reduces shear forces of pellets against the inner wall of drum 10 upon continued rotation of screw 12, thereby saving energy associated with operation of plasticating screw 12.

The motive mechanism for opening and closing the valve comprises essentially rack gear 68 and pinion gear 70 which are mutually engaged. Pinion gear 70 can be rotated manually by means of handle 72 and this rotation results in vertical movement of rack gear 68. Rack gear 68 is attached to the back surface of upper plate 48 and extends through slot-like opening 74 in wall 76 of feed conduit 32. As shown in FIG. 2, handle 72 is connected to pinion gear 70 by means of shaft 78 which is supported by bearings 80 extending from wall 76. Any locking means, such as wing-type lock nut 82 extending through a bearing 80 to a slot, not shown, in shaft 78 can secure the rack and pinion device against rotation once a size for opening 60 which is suitable for continuous operation of screw 12 has been secured. Generally, a particular valve opening, once set, can remain fixed for a given pellet size and mold.

An important feature of this invention is that when the valve is in the fully closed position, or even in an open or partially open position there is essentially no accumulation of particulates below the valve, except the material already within the root valley of the screw. This is because of the extreme proximity of edge 62 of the valve gate to the top of flight 16. Thereby, uncontrolled gravity flow to the screw is avoided. In this manner, the flight valley can be filled only to a partially full position and the screw is not overloaded so that high shear forces at the drum wall with accompanying excess energy consumption are avoided.

I claim:

1. An apparatus for regulating the flow of plastic particulates to the feed opening of a cylinder of a plasticating screw comprising a feed throat conduit for mounting on said feed opening and a valve mechanism mounted within said conduit for regulating the flow of plastic particulates, said valve mechanism comprising upper and lower members, said upper and lower members joined together by pivot means so that said lower member can swing on said pivot means, bracket means mounted on a wall in said conduit with said upper member slidably retained by said bracket means, fulcrum means mounted on said wall in said conduit at a position below said pivot means, said lower member extending downwardly and bearing on said fulcrum means so that said fulcrum means causes said lower member to swing about said pivot means relative to said upper member as said upper member slides vertically within said bracket means, motive means associated with said upper member to cause said upper member to slidably move within said bracket means, said lower member comprising a swinging gate for opening and closing said conduit as said motive means moves said upper member.

2. The apparatus of claim 1 wherein said conduit is square or rectangular in cross-section and said upper and lower members are flat plates.

3. The apparatus of claim 1 wherein said fulcrum means comprises wedge means having a triangular cross-section.

4. The apparatus of claim 1 wherein said motive means comprises a rack and pinion assembly with said rack mounted on said upper member through a slot on said wall of said conduit.

5. The apparatus of claim 4 wherein said pinion is manually operated.

6. The apparatus of claim 5 including locking means to prevent movement in said rack and pinion assembly.

7. The apparatus of claim 1 including a plasticating screw located within a cylinder having a feed opening with said feeding apparatus mounted at the feed opening of said cylinder.

8. The apparatus of claim 7 including a hopper positioned above said conduit for supplying plastic particles to said conduit.

9. The apparatus of claim 3 wherein said lower member rests flush on an inclined surface of said wedge means when said valve mechanism is in a closed position.

10. An apparatus for regulating the flow of plastic particulates comprising the cylinder of a plasticating screw, said cylinder having a feed opening, a vertical feed throat conduit having an upper inlet end and a lower discharge end, said conduit having a square or rectangular cross-section, a hopper for supplying plastic particulates mounted at said inlet end, said discharge end mounted at said feed opening of said cylinder and a valve mechanism for regulating flow of plastic particulates mounted within said conduit, said valve mechanism comprising upper and lower plate-like members, said upper and lower members being joined together by pivot means so that said lower member can swing on said pivot means, bracket means mounted in said conduit with said upper member slidably retained by said pivot means, fulcrum means mounted in said conduit at a position below said pivot means, said lower member bearing on said fulcrum means so that said fulcrum means causes said lower member to swing about said pivot means as said upper member slides within said bracket means, rack and pinion means mounted on said upper member to slidably move said upper member within said bracket means, said lower member comprising a swinging gate for opening and closing said conduit as said upper member moves in said bracket means.

11. A method for regulating the flow of plastic particulates from an overhead hopper through a feed throat conduit to a feed opening in the cylinder of a plasticating screw, said method comprising installing within said conduit a flow regulating valve comprising upper and lower plate-like members joined together by pivot means with said lower member extending downwardly and bearing upon a fulcrum member disposed below said pivot means, moving said upper member upwardly or downwardly in a vertical direction, said fulcrum member thereby causing said lower member to swing relative to said upper member as a result of said vertical movement to open and close the feed throat, a downwardly vertical movement of said upper member causing said lower member to close said feed throat, said lower member moving into closer proximity with said feed opening when closing said feed throat as compared to the position of said lower member when said feed throat is open.

12. The method of claim 11 wherein said conduit is square or rectangular in cross-section and said upper and lower members are flat plates.

13. The method of claim 11 wherein said fulcrum member comprises wedge means having a triangular cross-section.

14. The method of claim 11 wherein said upper member is moved upwardly and downwardly by a rack and pinion assembly.

15. The method of claim 11 wherein said upper member is manually moved upwardly and downwardly.

16. The method of claim 11 including a locking step for locking said valve to prevent upward or downward movement of said upper member.

17. The method of claim 13 wherein said lower member rests flush on one surface of said wedge means when said feed throat is closed.

* * * * *